Nov. 6, 1934.  I. L. TENNEY  1,979,354
WINDING DEVICE
Original Filed July 28, 1931   5 Sheets-Sheet 1

Fig. 1.

INVENTOR
Irving L. Tenney
BY his ATTORNEY
Sheldon H. Graves.

Nov. 6, 1934.　　　　I. L. TENNEY　　　　1,979,354
WINDING DEVICE
Original Filed July 28, 1931　　5 Sheets-Sheet 3

Fig. 3.

INVENTOR
Irving L. Tenney
BY his ATTORNEY
Sheldon H. Graves.

Nov. 6, 1934.  I. L. TENNEY  1,979,354
WINDING DEVICE
Original Filed July 28, 1931   5 Sheets-Sheet 5

Patented Nov. 6, 1934

1,979,354

UNITED STATES PATENT OFFICE 1,979,354

WINDING DEVICE

Irving L. Tenney, New York, N. Y.

Application July 28, 1931, Serial No. 553,558
Renewed March 23, 1934

24 Claims. (Cl. 88—18.7)

This invention relates to winding devices such as may be used in conjunction with recording of sound on flexible material, the reproduction of the sound and as well as taking and exhibiting motion pictures.

One object of my invention is to provide a winding means for an endless film, wire or flexible body which in operation is adapted continuously to feed the entire length of the body past some point at which a sound or scene record may be made on the body or from which such records may be reproduced. As an example of one use of my invention I may employ my device for winding a continuous film having thereon a sound record groove in the form of a spiral, each turn of which passes over the entire length of the film, the successive turns being closely spaced side by side. By the use of my improved apparatus a film of this character may be fed in such a way that the film will move, continuously and repeatedly, past the point of recording or reproducing so that the entire groove may be cut in one continuous operation and similarly the sound may be reproduced from the entire spiral record without any interruption.

One object of my invention is to provide a winding device of this character which will accommodate a relatively long film or flexible body within a relatively small space and a further object of my invention is to provide a device of this character which is simple in construction, durable in use, which is efficient in operation and may be easily manipulated. A further object of my invention is to provide a device of this character which will feed the film at an even rate, without vibration and at any convenient speed.

In one embodiment of my invention I employ two spaced reels, one of which winds the film while the other unwinds it, these reels are constructed so that the endless film is looped at the center of the reel and is wound on the reel doubled on itself. The parts or stretches of the film as they pass off from one reel to be wound onto the other are spaced from one another, one of the stretches passing over the recording or reproducing anvil or in the case of a photographic film passing by or in front of recording or reproducing lens. As but one of the two stretches of film is passing by the recording or reproducing point, it is apparent that with a complete unwinding of one reel only one half or less of entire film will have been passed by the point. To cause the entire film to move past this point, I provide means operative when one of the reels is unwound and the other completely wound, for interchanging the position of the reels and causing the reel which has been winding the film, to unwind it and the reel from which the film has been unwound to engage and wind it, as will be more fully explained hereafter. In this manner the entire length of film will be fed over the anvil or other point of recording or reproducing and on repetition of the operation above described, namely, of transferring the wound reel to a position for unwinding and the unwound reel to a position for winding, the length of film may again be fed over the anvil.

Where a spiral sound groove is employed on endless flexible film, suitable means may be provided for shifting the recording or reproducing stylus laterally of the film as the film passes over the anvil and where a film is employed having two or more parallel rows of motion picture scenes thereon, suitable guiding means may be provided for shifting that part of the film which passes by the lens, laterally of its length, so that the different rows may be utilized.

Still further objects of my invention will appear from the following description taken in connection with the accompanying drawings wherein.

Figure 1:
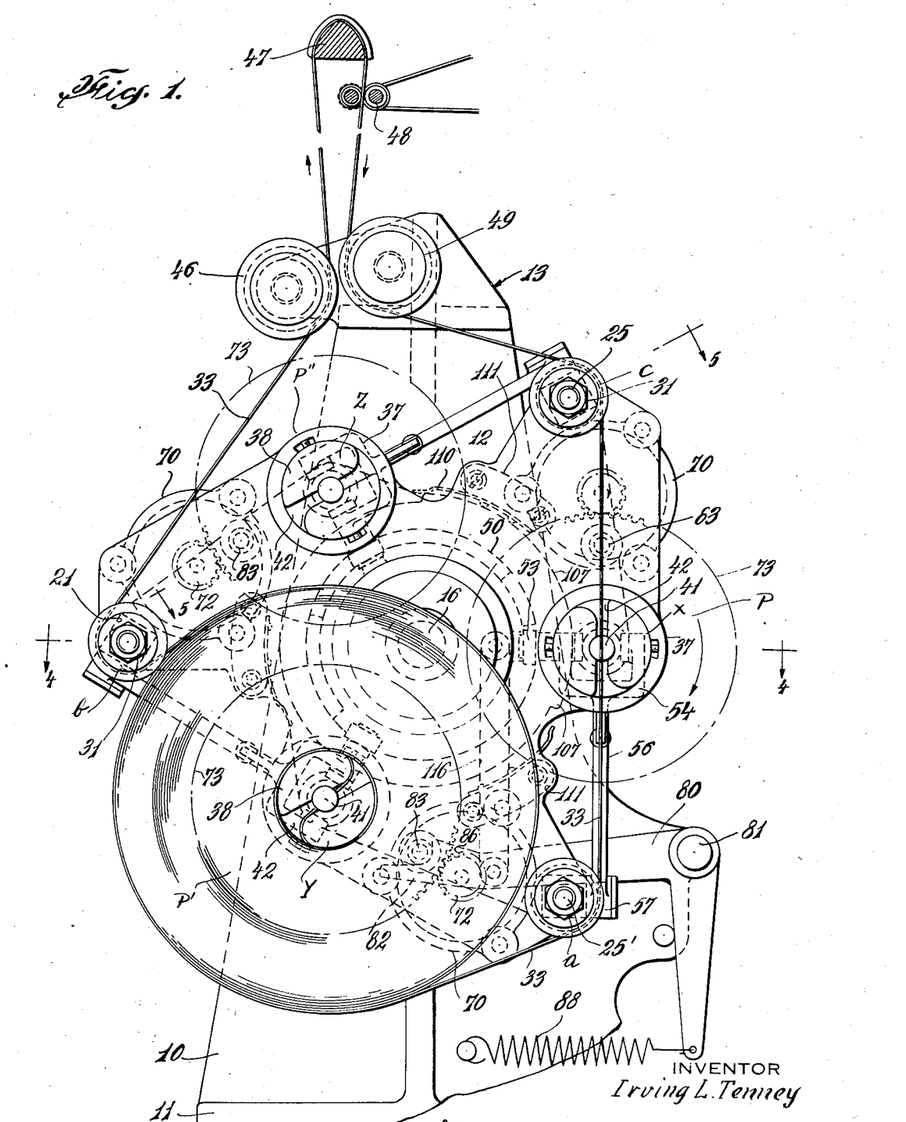
Figure 1 is a front elevation of a winding device forming one embodiment of my invention.
Figure 2:
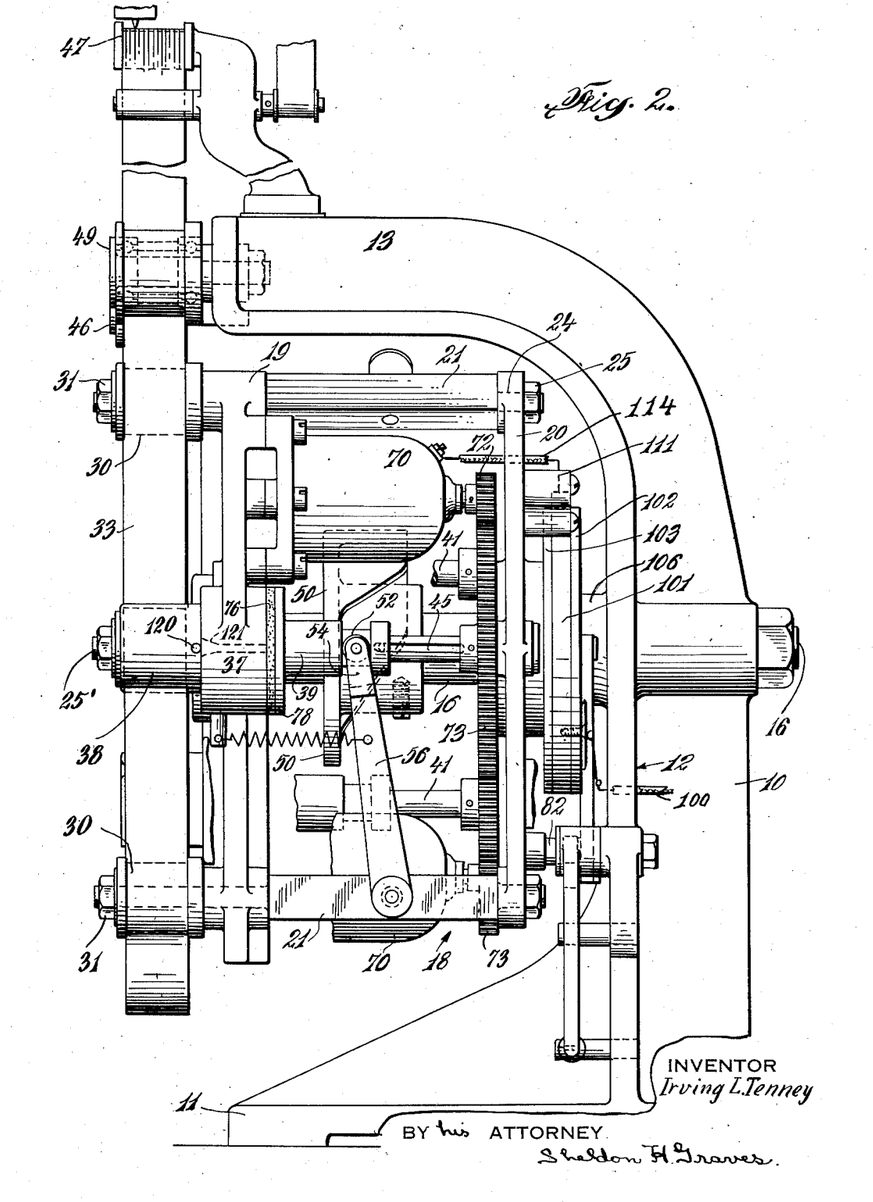
Figure 2 is a side elevation of the structure shown in Figure 1.
Figure 3:
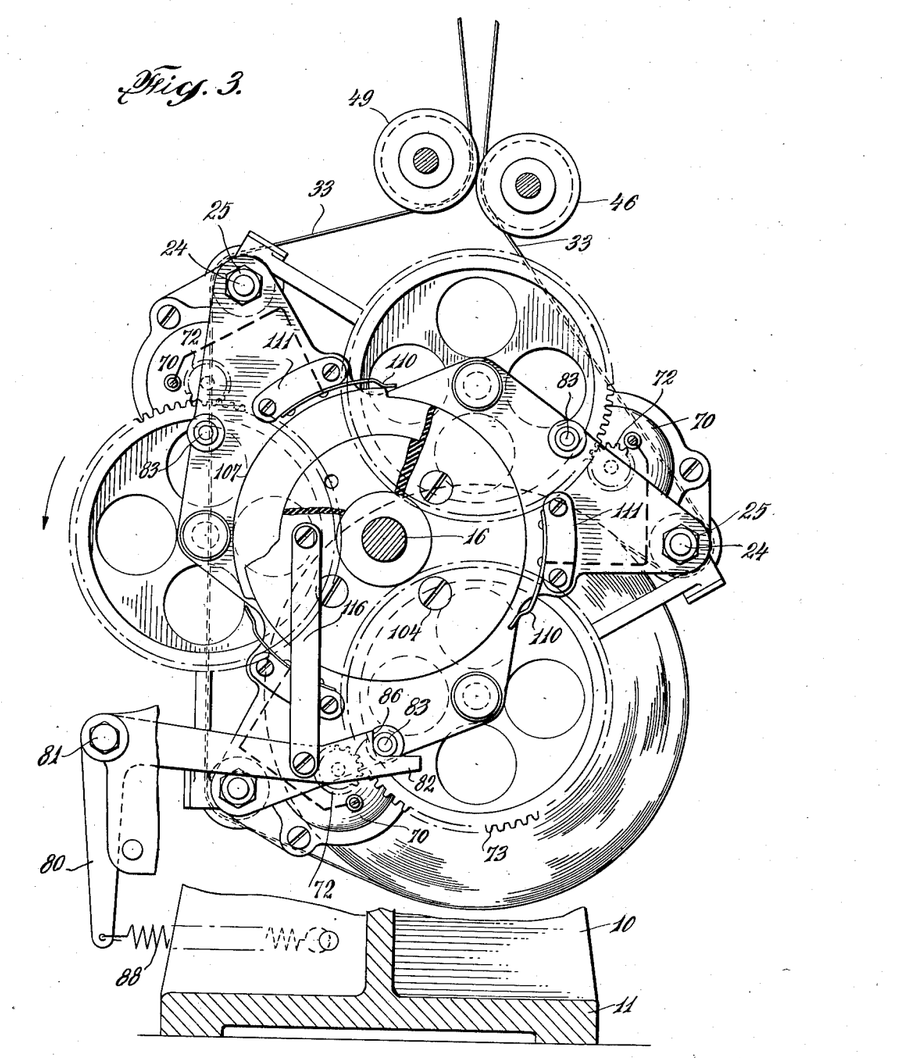
Figure 3 is a rear elevation looking in a direction from the right of Figure 2 with certain of the parts broken away and part of the supporting frame removed.

Referring more particularly to Figures 1 to 3, reference character 10 represents a supporting frame comprising a base 11, an upright portion 12 and an over-hanging portion 13. Rigidly mounted in the upright portion 12 is a stationary horizontal shaft 16 upon which is journaled, in ball bearings 17, a unit or frame work 18 comprising front and rear spiders 19 and 20 respectively which are rigidly connected to one another by square rods 21 of which there are three in number, spaced from one another at an angular distance apart of 120°. Each rod is formed with a rearward screwthreaded reduced extension 24 which is received in an opening in the spider 20 and receives a nut 25 to secure the rod to the spider. Each rod 21 is also formed with a reduced forward extension 25' which passes through the spider 19 and carries near its outer end an idler roller mounted to rotate on ball bearings 30 and held in position on the shaft by a nut 31 (see Figure 4). Three of these idler rollers are employed designated respectively a, b and c (see particularly Figure 1). The idler rollers a, b and c are adapted to carry a film 33 and mounted on the frame work 18 between each pair of idler rollers are film winding and unwinding mandrels designated respectively as x, y and z. Each of the mandrels is rotatably mounted in a large bearing 37 in the spider 19 and is formed with an outwardly extending winding portion 38 and inwardly extending reduced portion 39 and is formed with a central opening 40 adapted to receive the slotted shaft 41, journaled in a bearing 42 in the spider 20. The mandrel is adapted to slide on the shaft 41 and is adapted to be rotated by the shaft through the pin and slot connection indicated at 45 in Figure 2. The mandrels being mounted on the spider unit 18 are movable therewith and in Figure 1 the three mandrels occupy respectively the positions P, P' and P''.

The outer end or winding portion of the mandrel is formed with a transverse slot 42 through which the film 33 extends when the mandrel is operating to wind or unwind the film. Figure 1 shows the film extending vertically through the slot 42 of the mandrel x and it will be seen from this figure that the slot 42 is enlarged toward the left at the top and toward the right at the bottom so that the wall of the slot at this point gradually curves outwardly and merges with the outer periphery of the mandrel.

In Figure 1 the mandrel x occupying position P is about to start winding the film 33, the rotation of the mandrel for this purpose being in a clockwise direction. In so winding, film will be drawn upwardly over the idler a from the mandrel y and will also be drawn downwardly over the idler c. As a portion of the film will be retained in the slot 42 during the winding operation, this operation at its beginning, serves to bend the film against the curved walls at the ends of the slot and subsequently to wind both stretches of film around the periphery of the mandrel. The gradual curvature of the slot at its ends prevents a sharp bending of the film at the point. Furthermore, with a mandrel formed as shown in Figure 1 the coil or reel of film wound on the mandrel is substantially cylindrical, there being practically no flattening or bulging of the peripheral surface of the coil.

As previously stated the mandrel x occupying position P in Figure 1 is about to start winding the film and the mandrel Y in position P' is about to start unwinding. One stretch of the film unwound from mandrel y passes over the idler a and onto the mandrel X. The other stretch passes over idler b upward over a guide roller 46 rotatably carried at the front end of the over-hanging portion 13 of the frame 10; thence up over an anvil 47 which may be a recording or reproducing phonographic anvil; thence down between feed rollers 48 which may be connected with any suitable source of power not shown; thence downwardly partly around the guide roller 49 also carried by the frame portion 13; thence over the idler c and onto the mandrel X. The feed 48 may be by sprocket or friction.

When the film is entirely unwound from mandrel Y and a corresponding amount of film wound on the mandrel X, the frame work or spider unit 18 is revolved so that the filled mandrel X is moved in a clockwise direction, as viewed in Figure 1, so that the mandrel X occupies the position P', the mandrel Y moving to the position P'' and the mandrel Z moving to position P.

Figure 4:
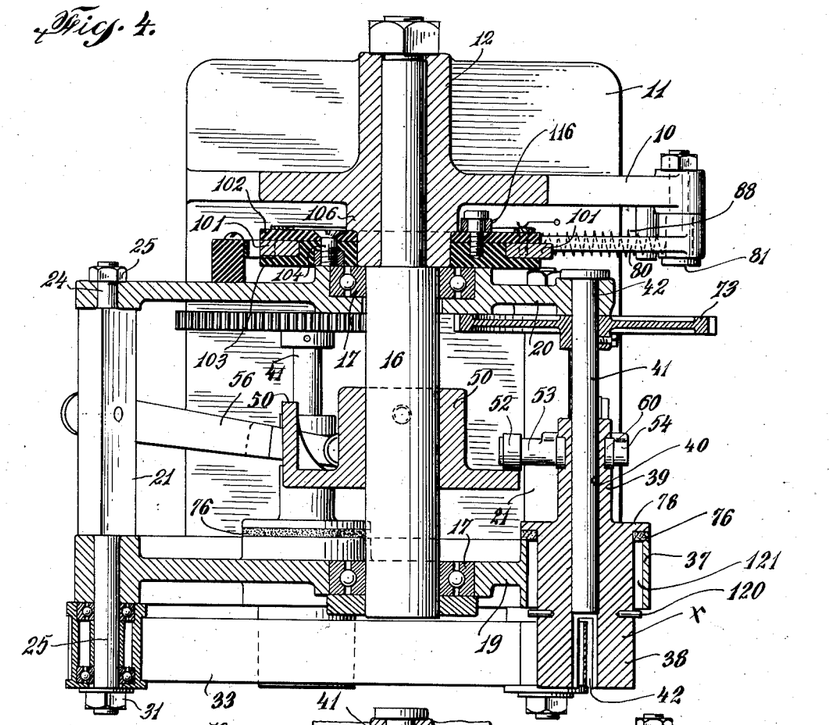
Figure 4 is a sectional view, partly in elevation, taken on the line 4—4 of Figure 1.
Figure 5:
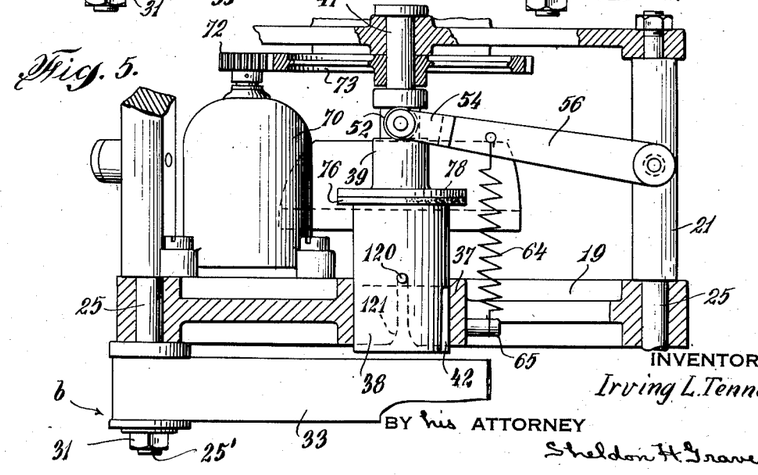
Figure 5 is a sectional view taken on the line 5—5 of Figure 1, certain of the parts being shown in elevation and others being broken away.

To disengage the film from each mandrel as it is moved upwardly from position P' to position P'', I provide a means by which the mandrel may be withdrawn longitudinally of its axis into spider 19 so that its outer or slotted end occupies a position inside the bearing 37. In Figure 4 a mandrel is shown in its extended or film engaging position while in Figure 5 is shown a mandrel in its withdrawn position. For the purpose of withdrawing the mandrel from the film as it moves to position P'' and for subsequently advancing the mandrel so as to engage the film as it moves to position P, I provide a cam 50 which is rigidly secured to the central stationary shaft 16 and engaging the surface of the cam is a roller 52 carried by a lateral extension 53 on a fork 54 formed at one end of an arm 56 pivoted at 57 on a cross-bar 21 (see Figures 4 and 5). Three arms 56 are employed, each pivoted to a different cross-bar 21 and each serving to withdraw and advance its respective mandrels. Each of the forks or yokes 54 carries rollers 60 which engage the walls of an annular groove 61 in the mandrel head, so that on swinging of the arm 56 in one direction or the other the mandrel will be advanced to the positions shown in Figure 4, or withdrawn to the position shown in Figure 5, the mandrels telescoping the shaft 41. Withdrawal of the mandrel from the position shown in Figure 4 is accomplished by engagement of the roller 52 with the cam 50 as the spiders revolve about the axis of the shaft 16 and the advance of the mandrel to position shown in Figure 4 is accomplished by a spring 64 which connects the arm 56 with the pin 65 projecting from the center hub of the spider 19.

The operation of the device takes place in successive stages, during one stage one mandrel is winding the film and another unwinding. During this stage the spider unit 18 is stationary. During the next stage which occurs when the mandrel occupying position P is wound and that occupying position P' is completely unwound, the spider unit 18 is rotated in a clockwise direction and during this stage of the operation none of the mandrels are winding or unwinding the film. In the embodiment of my invention herein disclosed, the turning of the spider unit 18 is accomplished by the pull on the film derived from the feeding device 48. During the rotation of the spider unit the feeding mechanism continues to draw the film from the left-hand of Figure 1 and feed film to the right-hand of Figure 1 and the rotation of the spider unit during this stage of the operation is at such a rate that the speed of film passing over the anvil 47 is maintained the same as when the mandrels are winding.

To provide the necessary power for turning the mandrels to wind the film when they successively occupy position P, I provide for each mandrel an electric motor 70 which is firmly secured to the inside face of the spider 19, there being three such motors, one for each mandrel as shown, for example, in Figure 1. The shaft of each motor carries a pinion 72 which meshes with the gear wheel 73 of which there are three, rigidly secured to the respective shafts 41. I also provide a suitable controlling means for the motor which serves to close the motor circuit, at the instant a mandrel reaches the position P and maintains the circuit closed throughout the winding operation and for an additional period until the spider unit has swung the mandrel to the position P'. While in the position P of Figure 1 the mandrel is rotating in a clockwise direction and winding the film, and the winding operation is completed before the mandrel is moved to position P'. When the winding is completed the motor is prevented from continued rotation by the tension of the film but during the time the mandrel is being swung to position P', I maintain the motor energized so as to prevent unwinding and a consequent slackening of the film. To prevent slackening by too rapid unwinding of the mandrel in the position P', I provide a means for exerting a moderate friction opposing rotation of the mandrel. This means is shown in Figure 4 as a fibre washer 76 interposed between the bearing 37 on the spider 19 and a flange 78 on the mandrel head. It will be noted that when the mandrel occupies the position shown in Figure 4 it is being pressed forward by the spring 64 and the arm 56, thus providing the requisite pressure to maintain a frictional contact between the fibre disc 76 and the flange 78.

To prevent backward turning of the spider unit 18 after the mandrels have reached the positions P, P' and P'', which might be caused by the pull by the winding mandrel on the film, I provide a stop in the form of a bell crank lever 80 pivoted at 81 on stationary frame 10. Lever 80 is formed at one end with a shoulder 82 adapted to be engaged by a pin 83 secured to the back of the spider 20. Three pins 83 are employed spaced apart 120° as shown in Figures 1 and 3, which successively engage the shoulder 82 of the lever 80 as the spider unit is rotated in successive steps. The lever 80 inwardly of the shoulder 82 is formed with an upwardly inclined portion 86 which is initially engaged by the pin 83 thus turning the bell crank 80 in a counter-clockwise direction, as viewed in Figure 1, against the action of a spring 88 until the pin passes the top of the shoulder 82, when the spring 88 moves the lever 80 to the position shown in Figures 1 and 3 in which the pin is prevented from moving backward by engagement with the shoulder.

In Figure 2 I show conventionally a supply circuit for one of the motors 70. Current is supplied from one terminal of a suitable source through conductor 100 to annular metal disc 101 which is held between insulating plates 102 and 103 secured to one another by bolts 104 and carried by a shouldered bushing 106 formed on the stationary supporting frame 10. The disc 101 and its supporting plates 102 and 103 are not rigid with the bushing 106 but are adapted to have a limited rotary movement about the axis of the bushing, for a purpose which will be presently explained. The disc 101 is formed with a raised peripheral portion 107 shown more clearly in Figures 1 and 3. This raised portion is adapted to be engaged by a spring contact 110 mounted on a fibre block 111 secured to the back of the spider 20. Three of such blocks and contacts are employed, one for each motor. The contact 110 is connected to one terminal of the motor by a conductor 114 shown diagrammatically in Figure 2. The other terminal of the motor is suitably connected by means not shown with the other terminal of the source of supply. This, in certain cases, may be through the frame of the machine, the other terminal of the source of supply being suitably grounded.

From the above description it will be seen that as the spider unit carrying the mandrels revolves the contact brushes 110 which are connected with the respective motors 70 will engage raised portion 107 of the contact disc 101 at the time the mandrel operated by such motor reaches the position P thus closing the circuit to and energizing the motor. It will also be seen from Figure 1 that a brush 110 is about to leave the raised portion 107 at the time the mandrel which is controlled by this brush, approaches the position P' and, thus is about to break the circuit to the motor of this mandrel. At the same time the brush for the motor of the preceding mandrel is about to contact with the raised portion 107 and the circuit to the motor which operates the preceding mandrel is about to be closed. It is also clear that circuit to the said motor will be closed while the mandrel operated by the motor is in position P and will remain closed until the mandrel is about to reach the position P'.

At the time the mandrel has reached the position P' the preceding mandrel has reached the position P it is desired to break the circuit through the motor for the mandrel in position P' and to make the circuit to the motor for the mandrel in position P. I have provided an improved means by which these circuits may be made and broken quickly and instantaneously. This means comprises a link 116 connected at one end to the bell crank lever 80 and at its opposite end to the fibre plates 102 and 103 forming part of the controlling segment. This link 116 serves to rotate the contact disc 101 slightly in one direction or the other as the bell crank lever 80 is moved in a clockwise or counter-clockwise direction.

In operation, at the time a pin 83 engages the inclined portion 86 of the lever 80, the brush 110 at the top of Figure 1 which controls the mandrel in the position P has approached quite close to the raised portion 107 of the contact disc but has not as yet made contact therewith, while the brush shown at the lower right-hand part of the Figure 1 and which controls the mandrel in position P', is still in contact with the raised portion 107 of the disc 101. Further movement of the spider unit from the position described causes the pin 83 to turn the lever 80 in a counter-clockwise direction against the action of the spring 88 and in so moving causes the contact disc which is connected to the lever 80 by the link 116 to rotate a short distance with the spider unit thus maintaining for the time being the lower right-hand brush 110 in contact with the raised portion 107 and maintaining the upper brush 110 out of contact with this raised portion. The movement of the disc 101 with the spider unit continues until the pin 83 has passed the top of the shoulder 82 when the spring 88 acting on the lever 80 causes it to rotate quickly in a clockwise direction which raises the link 116 and rotates the disc 101 quickly in a counter-clockwise direction, that is, in a direction contrary to that in which the spider unit is rotating. This movement of the disc 101 serves to break the contact between the lower right-hand brush 110 and the contact segment and simultaneously to make contact between the upper brush 110 and the contact segment. Contact to the motor controlling the mandrel occupying position P is thus made simultaneously with the breaking of the contact to the motor controlling mandrel occupying position P'.

Figure 6:
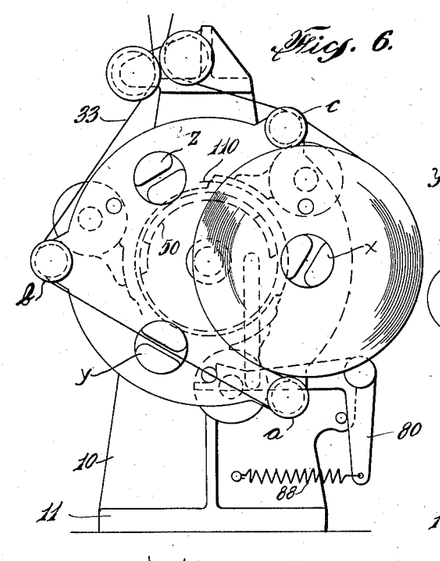
Figures 6, 7, 8 and 9 are diagrammatic front elevations showing the parts in positions which they occupy successively during the operation of the device.

For the purpose of making the operation of my device more clear I have illustrated in Figures 6 to 9 successive positions of the various parts throughout the cycle of operations. In Figure 6 the relative positions of the mandrels are the same as when shown in Figure 1 except that the mandrel X has now completed the winding operation, winding the two stretches of film, one from above over the idler C and the other from below over the idler a. The film has been completely unwound from mandrel Y and as shown, the film is stretched between the idlers A and B through the slot 42 of the mandrel Y. As the circuit to the motor connected to the mandrel Y has been broken during the unwinding operation the film has been unwound from mandrel Y by the pull on the film due to the motor, which was winding of the mandrel X and to the feeding device 48. This unwinding taking place against the friction of the washer 76 as previously explained.

When mandrel Y is entirely unwound it will stop in approximately the position shown in Figure 6 with the slot 42 extending in approximately along the length of the film and means is employed as will be presently described, for holding the mandrel in this position, relative to idlers A and B until the spider unit has been rotated until the mandrel is in position to receive the film at the other side of the anvil.

Figure 7:
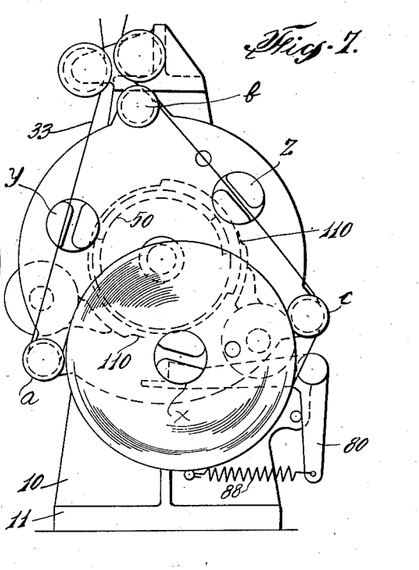

Starting from the position of the parts shown in Figure 6 the spider unit revolves, this revolution being caused by the pull on the film as previously explained. Figure 7 shows the position of the parts after a partial revolution of the spider unit. Between the position shown in Figure 6 and that shown in Figure 7 the roller 52 which controls the withdrawal of the mandrel Y has engaged the upwardly inclined face of the cam 50 with a result that the mandrel has been moved inwardly toward the spider 19 and thus freed itself from the film 33. Figure 7 indicates this, the film 33 being shown at one side of the slot 42 of the mandrel Y. While the mandrel Y is being withdrawn from the film, the mandrel Z which occupied the position P'' in Figure 6 but was in its withdrawn position as shown in Figure 5, has been moved over toward the right and in the position shown in Figure 7 is about to be advanced toward the film so as to engage therewith for subsequent winding.

Figure 8:
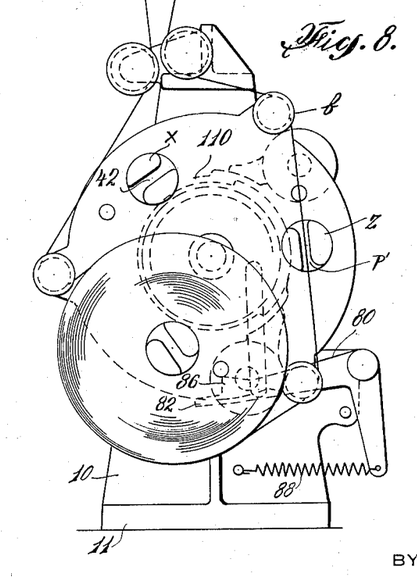
Figure 9:
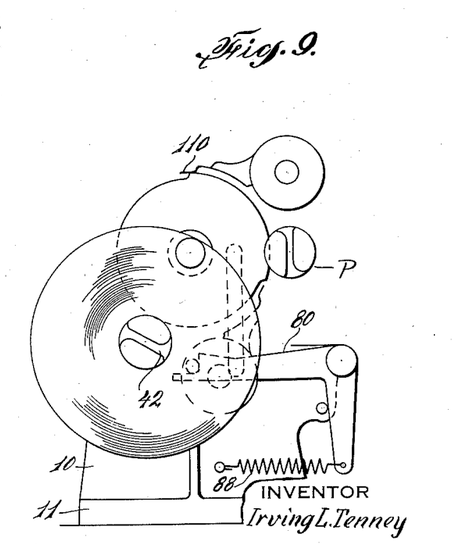

When the mandrel is withdrawn from the film as it moves from position P', I prevent turning of the mandrel at random about its own axis by engagement of pins 120 with the sides of rearwardly tapering recesses 121 in the inner walls of the bearing 37 of the mandrel head. These pins 120 cooperating with the inclined sides of recesses 121, which may guide or slightly turn the mandrel, serve definitely to position the mandrel with the slot 42 in line between the idler pulleys at opposite sides of the mandrel and this positioning of the mandrel in respect to the idler pulleys is maintained throughout the revolution of the spider unit until the mandrel has approached close to the position P which is the position of the spider unit shown in Figure 8. It will be seen from this figure, as well as Figure 7, that the idler B, by clockwise rotation of the spider unit, has engaged the stretch of film at the left and the film extends in a straight line between the idlers B and C and is in alignment with the slot 42 of the mandrel Z. This positions the film so that it may be received by the slot 42 as the mandrel is advanced by the arm 56. Figure 8 shows the lower pin 83 at the top of the shoulder 82 of the lever 80, the pin having turned the lever and consequently the contact segment 101. A moment later the parts are in the position shown in Figure 9, pin 83 has passed the shoulder 82, lever 80 has been moved by the spring 88 in a clockwise direction and the contact segment has been rotated in a counter-clockwise direction to break the circuit of motor for mandrel X and make the circuit for the motor of mandrel Z.

The successive steps above described are continued automatically as long as it is desired to pass the film over the anvil or through some equivalent device. Inasmuch as the movement of the spider unit is controlled entirely by the film, and not, for example, after some predetermined number of revolutions of the winding or unwinding mandrel it is apparent that the device is operative with any length of film desired, the only limitation being that the space occupied by a fully wound reel of film shall not encroach on other parts of the device. A reel carrying one thousand feet of five millimeter film has a diameter of approximately eleven and one half inches and a device to accommodate a film of this length with one inch available width with a spiral sound groove of one hundred laps to the inch would have a capacity of one hundred thousand feet of sound groove continuous running.

While in the embodiment of my invention herein disclosed, I show three mandrels it is apparent that I may employ instead only two mandrels which in their positions of winding and unwinding may conveniently occupy positions at diametrically opposite points of the spider framework. One advantage of employing three mandrels is that the movement of the mandrel from position P' to position P is through 240° of arc which is sufficient movement to permit the cam 50 to move the mandrel a considerable distance into and out of the spider 19. This in turn permits the use of a mandrel designed to accommodate a relatively wide film.

Having now described my invention what I claim and desire to secure by Letters Patent is:

1. In a winding device for a continuous film, two spaced winding reels adapted for winding the film doubled on itself, means for attaching the film to the reels for winding and for releasing the film therefrom after unwinding, guiding means separating the two parts of the doubled film as it is unwound from a reel, operating means for winding the film on each reel and for hindering the unwinding of the film therefrom and controlling means for causing the reels to exchange positions with respect to one another and causing winding operation of a reel in one of said positions and the unwinding of a reel in the other of said positions, said operating means comprising a motor for each reel movable with the reels when interchanging positions.

2. In a winding device for a continuous film, two spaced winding reels adapted for winding the film doubled on itself, means for attaching the film to the reels for winding and for releasing the film therefrom after unwinding, guiding means separating the two parts of the doubled film as it is unwound from a reel, operating means for winding the film on each reel and for hindering the unwinding of the film therefrom, means for moving the reels over an endless path, and for causing a reel occupying one portion of the path to wind the film and a reel occupying another portion of the path to unwind the film, said cooperating means comprising a motor for each reel movable with the reels when interchanging positions.

3. In a device of the character described, a rotary frame, a series of equally spaced winding reels thereon, a series of equally spaced guide rollers thereon positioned between said reels, and at a fixed distance therefrom, means for rotating said frame and means for rotating said reels.

4. Means for guiding a flexible member for engagement with a winding reel, the combination with such reel formed with a portion adapted for engagement with such member, means for supporting said member, a movable support for said reel, guides for said member mounted on said movable support at opposite sides of said reel, means for moving said last named support so as to position said member stretched between said guides and operating means for said portion to cause the same to engage the member while it is so stretched.

5. In a winding device, a support, a guide roller mounted on said support, a rotary frame mounted on said support, a plurality of mandrels carried by said frame, guide rollers mounted on said frame between said mandrels, a motor for turning each mandrel and controlling means operated by the rotation of said frame for controlling said motors.

6. In a winding device, a support, a rotary frame mounted on said support, a plurality of mandrels carried by said frame, an electrical motor for turning each mandrel and controlling means for said motors, comprising a contact segment carried by said support, and cooperating brushes carried by said frame and means controlled by rotation of said frame for causing said segment and brushes to break the circuit of one motor and simultaneously make the circuit of another motor.

7. In a winding device, a support, a rotary frame mounted on said support, a plurality of mandrels carried by said frame, a motor for turning each mandrel and controlling means for said motors, comprising a contact segment carried by said support, and cooperating brushes carried by said frame and spaced to close the circuit of one motor simultaneously with the breaking of a circuit to another motor and means operated by the movement of said frame for rotating said segment on said support to cause a quick making and breaking of the respective circuits.

8. A mandrel for winding a flexible member, comprising an integral head having a wide transverse slot at the end, said slot passing substantially through the center of said head and the two walls of said slot respectively at their opposite ends being curved outwardly to merge with the outer cylindrical surface of the head, means for rotating said mandrel and means for reciprocating said mandrel in the direction of its axis.

9. In means for guiding a flexible member for engagement with a winding mandrel, the combination with such mandrel formed with a slot for the reception of said member, a movable support for said mandrel, guides for said member mounted on said movable support at opposite sides of said mandrel, means for moving said support so as to position said member stretched between said guides, and operating means for causing said mandrel to advance axially to embrace the flexible member while so stretched.

10. In means for guiding a flexible member for engagement with a winding mandrel, the combination with such mandrel formed with a slot for the reception of said member, a movable support for said mandrel, guides for said member mounted on said movable support at opposite sides of said mandrel, means for moving said support so as to position said member stretched between said guides, operating means for causing said mandrel to advance axially to embrace the flexible member while so stretched, and guiding means for said mandrel to insure the positioning of said slot on advance of said mandrel to receive said member.

11. In a winding device for continuous film, two spaced slotted winding mandrels adapted for winding a film doubled on itself with the film passing through the slot in the mandrel, means for winding the film on the mandrels in succession, and unwinding the film therefrom in succession, means for transposing the positions of the mandrels between winding operations, means for reciprocating the mandrels to withdraw an unwound mandrel from the film, and to advance the mandrel to embrace the film at a different point, and guiding means for the mandrel and film to align the slot of the mandrel and film, on advance of the mandrel.

12. In a winding device for continuous film, two spaced slotted winding mandrels adapted for winding a film doubled on itself with the film passing through the slot in the mandrel, means for winding the film on the mandrels in succession and unwinding the film therefrom in succession, a rotary support on which said mandrels are mounted, means for rotating said support to transpose the positions of said mandrels between winding operations, means for reciprocating the mandrels to withdraw an unwound mandrel from the film, and to advance the mandrel to embrace the film at a different point, and guiding means for the mandrel and film mounted on said rotary support so as to align the slot of the mandrel and film on advance of the mandrel.

13. In a winding device for a continuous film, a support, a plurality of mandrels carried by said support, means causing a mandrel to engage the film for winding and for releasing the film after unwinding, means for moving said support to move a mandrel into winding position and another mandrel into unwinding position, a source of power for turning the mandrels, and means connecting a mandrel with the said source for winding the film and disconnecting the mandrel from said source only after the wound mandrel has moved away from winding position.

14. In a winding device for a continuous film, a support, a plurality of mandrels carried by said support, means causing a mandrel to engage the film for winding and for releasing the film after unwinding, means for moving said support to move a mandrel into winding position, and another mandrel into unwinding position, a source of power for turning the mandrels, and means connecting a mandrel with the said source for winding the film and disconnecting the mandrel from said source as said mandrel reaches unwinding position.

15. In a winding device for a continuous film, a support, a plurality of mandrels carried by said support, means causing a mandrel to engage the film for winding and for releasing the film after unwinding, means for moving said support to move a mandrel into winding position, and another mandrel into unwinding position, a source of power for turning the mandrels, and quick acting means for simultaneously disconnecting a wound mandrel from said source as it reaches unwinding position and connecting an unwound mandrel as it reaches winding position.

16. In a winding device for a continuous film, a support, a plurality of mandrels carried by said support, means causing a mandrel to engage the film for winding, and disengage the film after it has been unwound therefrom, said support being freely rotatable in one direction by the pull of the film to move a mandrel into winding position and another mandrel into unwinding position, a source of power connected to the mandrels for turning the same when winding the film, the said winding of the film tending to turn said support in the opposite direction, a movable catch for preventing turning of said support in said opposite direction, and means controlled by said catch for operatively connecting said mandrels to said source of power as they assume winding position, and disconnecting the mandrels from said source of power as they assume unwinding position.

17. In a winding device for a continuous film, a support, a plurality of mandrels carried by said support, means causing a mandrel to engage the film for winding, and disengage the film after it has been unwound therefrom, said support being freely rotatable in one direction by the pull of the film to move a mandrel into winding position and another mandrel into unwinding position, a source of power connected to the mandrels for turning the same when winding the film, the said winding of the film tending to turn said support in the opposite direction, a movable catch for preventing the turning of said support in said opposite direction, and means controlled by said support and catch for operatively connecting said mandrels to said source of power as they assume winding position and disconnecting said mandrels from said source of power as they assume unwinding position.

18. A mandrel for winding a flexible film, comprising an integral head having a transverse slot at one end, said slot affording a straight path through the mandrel and the two walls of the slot respectively at their opposite ends, being curved outward to merge with the outer cylindrical surface of the head, means for rotating the mandrel, means for advancing the mandrel axially to embrace the film and for retracting the mandrel to disengage the film.

19. A mandrel for winding a flexible film, comprising an integral head having a transverse slot at one end, said slot affording a straight path through the mandrel and the two walls of the slot respectively at their opposite ends, being curved outward to merge with the outer cylindrical surface of the head, means for rotating the mandrel, means for advancing the mandrel axially to embrace the film and for retracting the mandrel to disengage the film, a movable support for said mandrels, and means on said support for so positioning the slot of the mandrel and film that on advance of the mandrel it will embrace the film without injury thereto.

20. In a winding device for a continuous film, a support, a plurality of mandrels carried by said support, means causing the mandrel to engage the film for winding and disengage the film after it has been unwound, said support being freely rotatable in one direction by the pull of the film to move a mandrel into winding position, and another mandrel in unwinding position, a source of power connected to the mandrels for winding same, the said winding of the film tending to turn said support in the opposite direction, and a movable catch for preventing turning of said support in said opposite direction and permitting the free turning of said support in said one direction.

21. Means for guiding a flexible member for engagement with a winding reel, in combination with such reel formed with a portion adapted for engagement with such member, means for supporting said member, a movable support for said reel, guides for said member mounted on said movable support at opposite sides of said reel, means for moving said last named support so as to position said member stretched between said guides, means for turning said reel for positioning said portion for engagement with said member and operating means for said portion to cause the same to engage the member while it is so stretched.

22. In a winding device for continuous film, two spaced winding mandrels, each formed with an opening extending across and inwardly from one end of the mandrel, said mandrels being adapted for winding a film doubled on itself with the film passing through the opening and the outer surfaces of the mandrels gradually merging into the walls of their respective openings, means for winding a film on the mandrels in succession and unwinding the film therefrom in succession, means for reciprocating the mandrels to withdraw an unwound mandrel from the film and advance the mandrel to embrace the film at a different point and means for moving each mandrel to insure positioning of the opening therein, on advance of the mandrel, to receive said film.

23. In a winding device for continuous film, two spaced winding mandrels, formed with an opening extending across and inwardly from one end of the mandrel, said mandrels being adapted for winding a film doubled on itself with the film passing through the opening and the outer surfaces of the mandrels gradually merging into the walls of their respective openings, means for winding a film on the mandrels in succession and unwinding the film therefrom in succession, means for reciprocating the mandrels to withdraw an unwound mandrel from the film and advance the mandrel to embrace the film at a different point and means for turning an unwound mandrel on its own axis to a predetermined position so that, on advance of said mandrel, said opening will receive said film.

24. A mandrel for winding a flexible member comprising a head having a substantially cylindrical outer surface and formed with an opening extending across said head and inwardly from its outer end, said opening affording a straight line path through the mandrel head and two walls of said opening at their opposite ends being curved outwardly to merge with the outer cylindrical surface of said head, the dimensions of said opening at the periphery of the head being such that substantially the greater part of the cylinder contour of the head is formed by said cylindrical surface, means for rotating said mandrel and means for reciprocating said mandrel in the direction of its axis.

IRVING L. TENNEY.